Aug. 10, 1965   J. W. FREDERIKSEN, SR   3,199,244
FISHING LURE
Filed Oct. 18, 1962
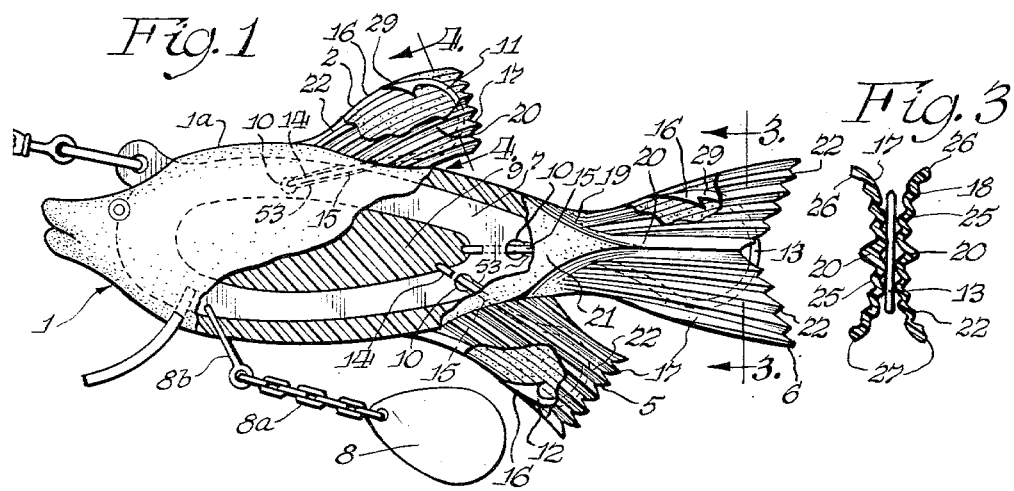
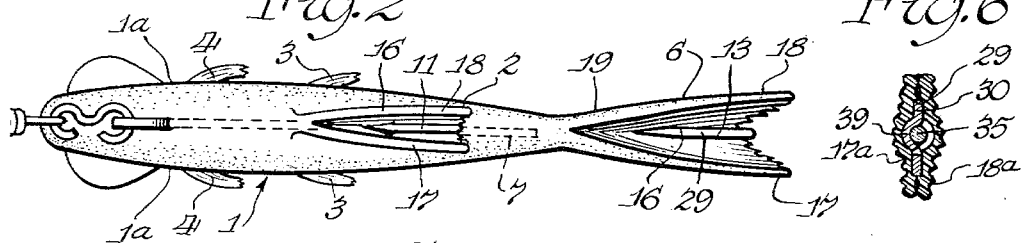
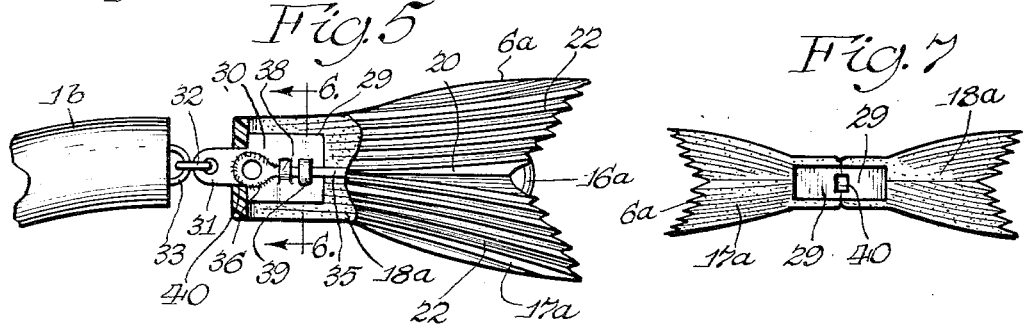
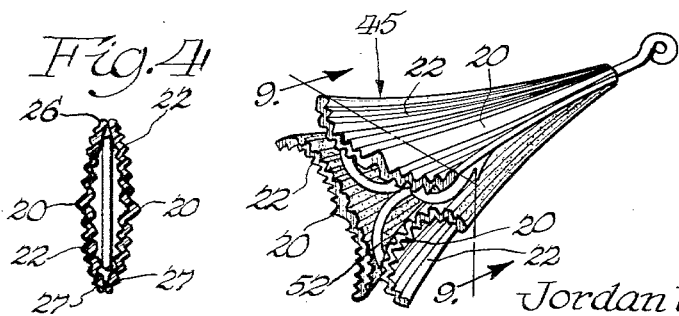
INVENTOR.
Jordan W. Frederiksen, Sr.
BY Richard J. Myers
Atty.

United States Patent Office 3,199,244
Patented Aug. 10, 1965

3,199,244
FISHING LURE
Jordan W. Frederiksen, Sr., 6133 W. Henderson St., Chicago 34, Ill.
Filed Oct. 18, 1962, Ser. No. 231,482
3 Claims. (Cl. 43—42.1)

This invention relates to fishing lures and in particular to fishing lures provided with protected and hidden fish hook means.

It is important to provide hook means for a fish lure that is hidden from the view of the fish and cannot become entangled in seaweed or the like and yet is easily caught in the mouth of the fish when the fish strikes at the lure or bait.

It is therefore a general object of this invention to provide a novel fish hook design for a fish lure.

Another object of this invention is to provide a fish lure hook that is hidden from the fish and protected from becoming snagged with objects in the water and is readily caught in the mouth of the fish when the fish strikes at the hook.

Another object of the invention is to provide a fish hook that is covered by flexible material so formed about the hook as to prevent snagging of the hook and yet readily catches in the mouth of a fish.

Another object of this invention is to provide a fish lure construction wherein one or more fish hooks may be concealed between a pair of flexible fish fin sections pivotally or integrally connected to the body of the fish lure.

A further object of this invention is to provide a fish lure having opposed bowed flexible portions surrounding the fish hook, the portions being readily diverted in hook exposing position for catching a striking fish.

Still another object of this invention is to provide a fish lure having a hook mounting structure surrounded by flexible portions including fin sections concealing a fish hook in anti-weed snag relation and being diverted to expose the hook upon a fish strike.

Other objects of the present invention are to provide an improved fishing lure, of the character described, that is easily and economically produced, which is sturdy in construction, and which is highly efficient in operation.

It will be understood that certain changes may be made in the construction or arrangement of the fish lure disclosure herein without departing from the spirit and scope of the invention as defined in the appended claims.

With the above and related objects in view, this invention consists in the details of construction and combination of parts, as will be more fully understood from the following description, when read in conjunction with the accompanying drawings in which:

FIGURE 1 is a side elevational view, partly in section, of the fish lure embodying the present invention;

FIGURE 2 is a top plan view of the fish lure;

FIGURE 3 is a sectional view taken along line 3—3 of FIGURE 1;

FIGURE 4 is a sectional view taken along line 3—3 of FIGURE 1;

FIGURE 5 is a view partly in section of a modified caudal fin or tail portion of the fish lure;

FIGURE 6 is a sectional view taken along line 6—6 of FIGURE 5;

FIGURE 7 is an unfolded view of the caudal fin shown in FIGURE 5;

FIGURE 8 is a further modified form of the fish hook lure; and

FIGURE 9 is a sectional view taken along line 9—9 of FIGURE 8.

With reference now to the drawings and in particular to FIGURES 1 through 4 there is shown a fish lure 1 having a flexible body 1a of elastomeric material such as rubber or plastic material being provided with a dorsal fin 2, pelvic fins 3, pectoral fins 4, anal fin 5, and a caudal fin or tail 6. the elastomeric body 1a having imbedded within it a reinforcing frame or structure 7 of hard material or metal. The frame 7 is flat plate of elliptical shape and has a hollow central portion 9 and is provided with a plurality of holes 10. The dorsal, anal, and caudal fins 2, 5 and 6 each have a fish hook such as hook 11, 12, or 13 having an end catch portion 14 passing through the hole 10 of the ring frame 7 and hooked on the end of frame 7 and has shaft portion 15 cradled in curved slot or indentation 53 of plate frame 7 and an enlarged C-shaped barbed or fish hook portion 16. A spinner blade 8 with chain 8a is connected by pin 8b to the forward underside of the fish lure 1 and is used as a means of stabilizing the lure 1 as it travels in the water as well as to attract the attention of the fish to the tail area rather than to act as a hook.

The caudal fin or tail 6 of the lure 1 consists of two vertical fin sections 17 and 18 enclosing the barb hook portion 16 of hook 13 and joined at their forward portions with one another and the body part 1a at the juncture 19 of the body 1a with the fin 6. Each fin section 17 and 18 has a central outside reinforcing rib 20 that extends from the rear of the fin section forwardly to merge into the fish body 1a at 21. Smaller horizontal ribs 22 extend above and below the central rib 20. The horizontal longitudinal ribs 22 and/or rib 20 maintain the fin sections 17, 18 straight and upright in a vertical position and prevent their collapse until the fish strikes and also give forward stability facilitating passage of the lure 1 through weeds, lily pads, etc. Each fin section 17 and 18, as viewed from the rear (see FIGURE 3) has a general thin straight up and down part 25 and end parts 26 and 27 at the top and bottom of the fin sections 17 and 18, the end parts 26 and 27 being of small extent relative to part 25 and extending transverse or perpendicular outwardly to part 25, i.e. a flaring out of the end sections 26 and 27 relative to the vertical part 25. It is to be noted that the top part 29 of the barb 16 of each of the hooks 11, 12 as with caudal fin hook 13 of FIGURES 1 and 3, is horizontal and is just at or below where the flaring of parts 26 and 27 from the part 25 occurs. Such a construction of the fin sections 17, 18 of the caudal fin 6 permits the hook 13 to be covered by the fin sections 17, 18 when the lure 1 is in the weeds and yet permits rapid separation of the flexible fin sections 17, 18 when a fish is striking at the caudal fin 6 of the lure 1 to permit the fish's mouth to be caught in the easily exposed hook portions 16. This is because the upper edges 26, 27 of the fin section 17, 18 are flared in close proximity to the barbed section 16 of hook 13 in order to bare the hook 16 quickly even when struck lightly by a fish which results in easy movement of ends or tabs 26, 27 down away from the horizontal port 29 of hook port of hook 16. FIGURE 3 is illustrative of this type of concave or outward flaring of the tips 26, 27 of the fin sections 17, 18.

The dorsal and anal fins 2 and 5 each have joined fin sections 17 and 18 about their respective hooks 11, 12 and have small ribs 22 like caudal fin 6.

In some instances it is desired to flare or bow the fin sections inwardly depending on the construction of the lure used. Inwardly bowed or convex formed fin sections are shown in the dorsal fin as seen in cross section in FIGURE 4 where the outer ends 26, 27 of the fin sections 17, 18 on the back of the flexible body 1 are turned in toward one another. Thus when a fish attacks the dorsal fin 2, the fin sections 17, 18 collapse in an inwardly bowed direction to expose the hook portion of the dorsal hook 11. Otherwise, the dorsal hook 11 is guarded by the fin sections 17, 18 of the dorsal fin 2. FIGURES 5, 6, and 7 are illustrative of pivotally connecting a novel caudal fin or tail 6a to a body 1b of a fish lure, the fin sections 17a, 18a of the tail 6a each having a recess 29 holding a bracket 30 having an eye part 31 and ring 32 pivotally connected with an eye part 31 and an eye part 33 of the body 1b. A shaft 35 is held on the bracket 30 by weld 36 and by tabs or fingers 38, 39 formed out of and hinged from the plate 30. The plate 30 is carried between each fin section 17a, 18a which as seen in expanded view in FIGURE 7 is continuous with each other and has an opening 40 through which shaft 35 passes at forward port of fin 6a. In this way bracket 30 is held in recesses 29, 29 of fin sections 17a, 18a which have their forward ports glued to form a completed caudal fin like that shown in FIGURE 1 and able to hold hook part 16a of shaft 35. The fingers 38, 39, weld 36 of bracket 30 glued in the fin sections prevent rotation of hook part 16a.

FIGURES 8 and 9 is illustrative of the triple fin 45 having a triple hook 52 with the type of outwardly flared or concave fin sections as shown in FIGURES 1 and 3.

It will also be appreciated that a double fish hook design can be used as well as a single fish hook design or triple fish hook design.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

I claim:

1. A fishing lure comprising; a body having a flexible fin portion, said fin portion comprising a pair of hook enclosing walls defining an open hook storing slot, a fish hook disposed in the slot between said walls, the hook lying generally in a plane passing through the longitudinal line of travel of the body and walls, each wall comprising a first inner wall section lying generally in a plane parallel to the hook, and a second outwardly extending lateral wall section connecting with the first wall section and flaring outwardly away from the hook and above the hook and lying in planes passing through the line of travel of the body and laterally transversely away from the plane of the hook to define with the other outer wall section a pair of outwardly diverging wall sections extending above the hook for conjunctively enshrouding the hook with the first wall sections and permitting rapid separation of the outer lateral wall sections away from one another and the hook in order to bare the hook quickly when struck by the fish.

2. A fishing lure comprising a body having a flexible fin portion, said fin portion comprising a pair of hook enclosing walls defining an open hook storing slot, a fish hook disposed in this slot between said walls, the hook lying generally in a plane passing through the longitudinal line of travel of the body and walls, each wall comprising a generally straight first inner wall section lying generally in a plane parallel to the hook, and a pair of opposed outwardly extending lateral curving wall sections connected with opposed ends of the first wall section, each outwardly extending wall section flaring outwardly away from the hook and beyond the hook and lying in planes passing through the line of travel of the body and laterally transversely away from the plane of the hook, each pair of outwardly extending wall sections defining with the other pair of outer wall sections two sets of outwardly diverging wall sections each of such sets extending in opposed directions above and beyond the hook for conjunctively enshrouding the hook with the first wall sections and permiting rapid separation of each outer lateral wall sections away from one another and the hook in order to bare the hook quickly when struck by a fish.

3. The invention according to claim 2, and each wall having a plurality of horizontally extending vertically stacked reinforcing ribs, said ribs including a centrally located enlarged reinforcing rib merging forwardly with the body.

References Cited by the Examiner
UNITED STATES PATENTS

| | | | |
|---|---|---|---|
| 1,331,266 | 2/20 | Keplinger | 43—137 |
| 2,183,816 | 12/39 | Lovelace | 43—42.35 |
| 2,261,068 | 10/41 | Mackovich | 43—43.2 |
| 2,482,881 | 9/49 | Sonner | 43—43.2 X |
| 2,590,461 | 3/52 | Rasch | 43—42.15 |
| 2,596,201 | 5/52 | Bocchino | 43—42.35 |
| 2,691,841 | 10/54 | Daniel | 43—42.1 |
| 2,741,058 | 4/56 | Allman | 43—42.24 |
| 2,971,285 | 2/61 | Murawski | 43—42.28 |
| 3,060,620 | 10/62 | Binkowski | 43—42.24 |

ABRAHAM G. STONE, *Primary Examiner.*

MELVIN D. REIN, *Examiner.*